United States Patent
Ting

(10) Patent No.: US 8,544,801 B2
(45) Date of Patent: Oct. 1, 2013

(54) BRACKET ASSEMBLY FOR DISK DRIVE

(75) Inventor: Yu-Chen Ting, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/408,156

(22) Filed: Feb. 29, 2012

(65) Prior Publication Data

US 2013/0020453 A1 Jan. 24, 2013

(30) Foreign Application Priority Data

Jul. 21, 2011 (TW) .................................. 100125870

(51) Int. Cl.
*G12B 9/00* (2006.01)
(52) U.S. Cl.
USPC ................... 248/27.3; 248/27.1; 248/220.21; 248/221.11; 248/222.11; 361/679.57; 361/679.37; 361/679.39
(58) Field of Classification Search
USPC ........ 248/27.1, 27.3, 220.21, 221.11, 222.11, 248/225.11, 611, 612; 361/679.33, 679.37, 361/679.57, 679.38, 679.39
See application file for complete search history.

(56) References Cited

U.S. PATENT DOCUMENTS

| | | | | |
|---|---|---|---|---|
| 5,123,721 A * | 6/1992 | Seo | ............................... | 312/333 |
| 5,262,923 A * | 11/1993 | Batta et al. | ................ | 361/679.37 |
| 5,301,088 A * | 4/1994 | Liu | ........................... | 361/679.58 |
| 5,921,644 A * | 7/1999 | Brunel et al. | ............... | 312/223.2 |
| 5,978,212 A * | 11/1999 | Boulay et al. | ............. | 361/679.31 |
| 6,099,098 A * | 8/2000 | Leong | ........................... | 312/333 |
| 6,249,430 B1 * | 6/2001 | Huang et al. | ............. | 361/679.31 |
| 6,297,954 B1 * | 10/2001 | Seo | .......................... | 361/679.02 |
| 6,337,793 B1 * | 1/2002 | Vier et al. | ................ | 361/679.57 |
| 6,351,378 B1 * | 2/2002 | Chao et al. | ............... | 361/679.33 |
| 6,609,619 B2 * | 8/2003 | Abbott | ............................. | 211/26 |
| 6,817,881 B2 * | 11/2004 | Chou | ............................ | 439/342 |
| 7,031,150 B2 * | 4/2006 | Chen et al. | ................ | 361/679.33 |
| 7,639,487 B2 * | 12/2009 | Liang et al. | ............. | 361/679.33 |
| 7,679,896 B2 * | 3/2010 | Deng et al. | ............... | 361/679.33 |
| 7,950,752 B2 * | 5/2011 | Lin | ................................ | 312/333 |
| 8,050,026 B2 * | 11/2011 | Chang | ...................... | 361/679.33 |
| 8,132,869 B2 * | 3/2012 | Wang et al. | ................ | 312/223.2 |
| 8,295,044 B2 * | 10/2012 | Chen et al. | ................. | 248/224.8 |
| 2008/0089021 A1 * | 4/2008 | Deng et al. | ..................... | 361/685 |
| 2008/0259554 A1 * | 10/2008 | Qin et al. | ....................... | 361/685 |
| 2011/0102998 A1 * | 5/2011 | Lin et al. | ..................... | 361/679.33 |
| 2011/0134598 A1 * | 6/2011 | Hsiao | ........................ | 361/679.33 |
| 2012/0293945 A1 * | 11/2012 | Wang et al. | .............. | 361/679.33 |

* cited by examiner

*Primary Examiner* — Nkeisha Smith
(74) *Attorney, Agent, or Firm* — Altis & Wispro Law Group, Inc.

(57) ABSTRACT

A bracket assembly includes a bracket and a tray secured in the bracket for accommodating a disk drive. The tray includes a base panel, a pair of side panels extending from opposite sides of the base panel, a first plate extending substantially perpendicularly from an upper edge of one of the pair of side panels, and a second plate extending substantially perpendicularly from an upper edge of the other one of the pair of side panels. The first plate and the second plate are partially overlapped with each other and fixed to each other. The tray includes a pair of sidewalls abutting inner sides of the pair of side panels and a pair of connecting pieces connected between the pair of side walls for supporting the disk drive.

17 Claims, 4 Drawing Sheets

BRACKET ASSEMBLY FOR DISK DRIVE

BACKGROUND

1. Technical Field

The present disclosure relates to a bracket assembly for disk drives.

2. Description of Related Art

People rely on computers in their everyday life and business. Thus, a great deal of data storage space such as hard disk drives is needed. Generally, the hard disk drives are accommodated in a bracket mounted in a computer. The bracket includes a base plate, a pair of side plates extending perpendicularly from opposite sides of the base plate, a pair of top flanges extending perpendicularly from top edges of the pair of side plates, and a top plate secured to the pair of top flanges by screws. The hard disk drives vibrate during operation, which also vibrates the bracket. Thus, the top plate can easily deform due to the vibration.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

Figure 1:
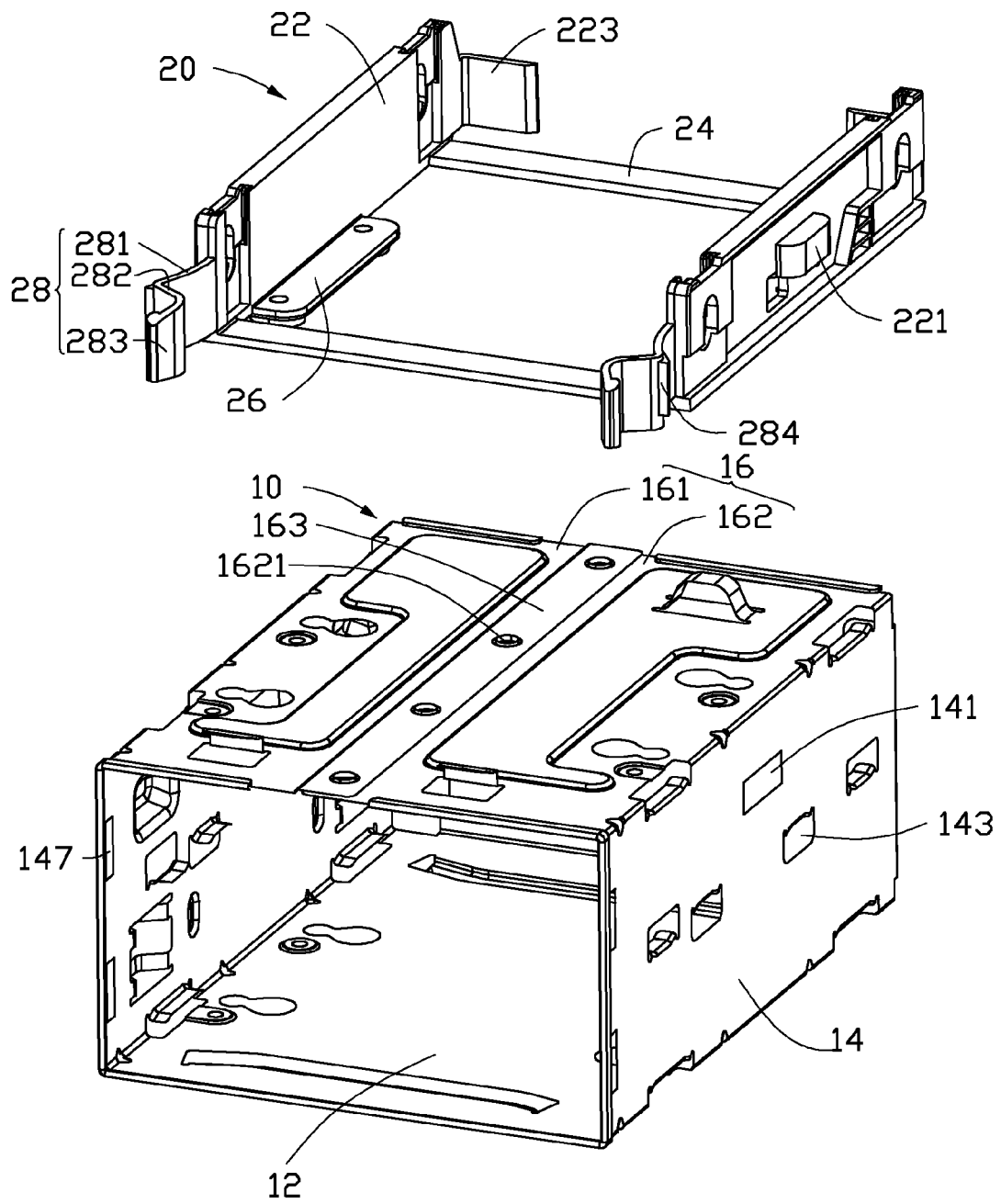
FIG. 1 is an exploded view of an embodiment of a bracket assembly for disk drives, the bracket assembly including a bracket and a tray.
Figure 2:
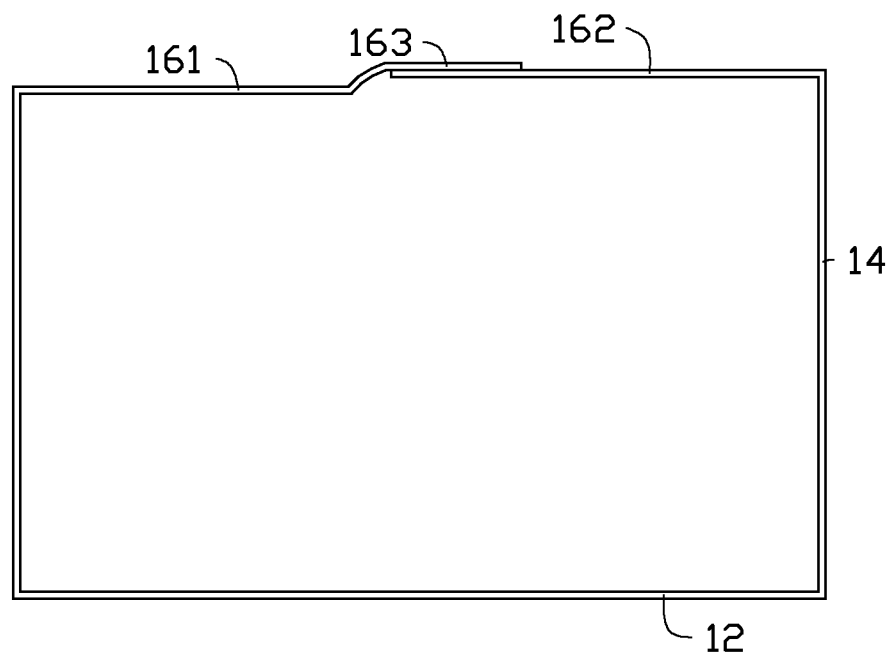
FIG. 2 is a schematic cross-sectional view of the bracket of FIG. 1.
Figure 3:
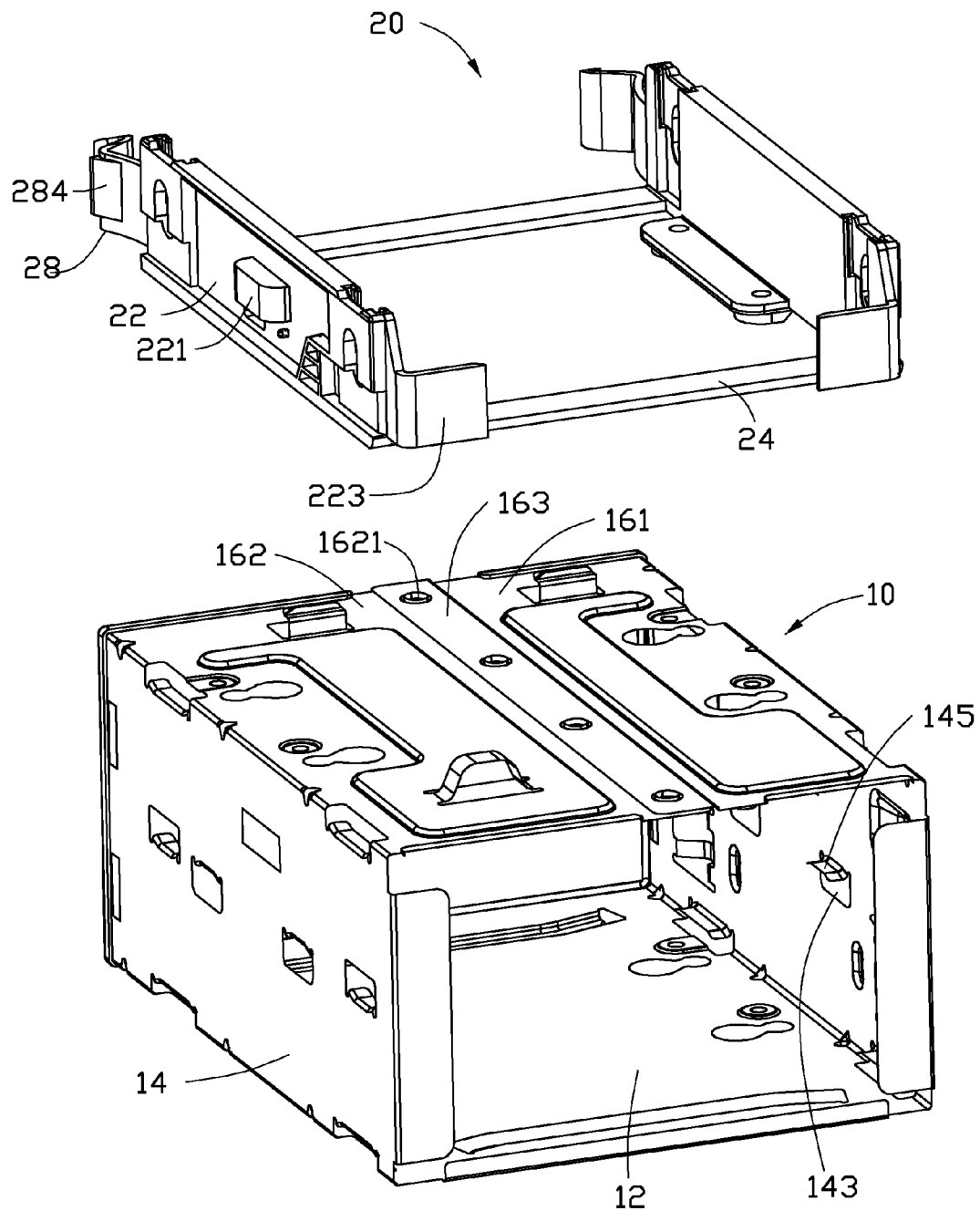
FIG. 3 is similar to FIG. 1, but viewed from another aspect.

Referring to FIGS. 1 through 3, an embodiment of a bracket assembly includes a bracket 10 and a tray 20. The bracket 10 includes a base panel 12, a pair of side panels 14 extending substantially perpendicularly from opposite sides of the base panel 12, and a top panel 16 connected between the pair of side panels 14.

The top panel 16 includes a first plate 161 extending substantially perpendicularly from a top edge of a first side panel of the pair of side panels 14 and a second plate 162 extending substantially perpendicularly from a top edge of a second side panel of the pair of side panels 14. The first plate 161 includes a bent flange 163 abutting on the second plate 162. A plurality of securing holes (not labeled) is defined in the bent flange 163. A plurality of securing posts 1621 protrudes from the second plate 162 and engages with the plurality of securing holes to secure the second plate 162 to the bent flange 163. A first rectangular opening 141 is defined in each of the pair of side panels 14 and located at a central portion of each of the pair of side panels 14. A pair of second rectangular openings 143 is defined in each of the pair of side panels 14 and located below the first rectangular opening 141. A supporting piece 145 extends from an upper flange of each of the pair of second rectangular openings 143 towards an inner side of the bracket 10 (see FIG. 3). At least one slit 147 is defined in each of the pair of side panels 14 and located adjacent a front edge of each of the pair of side panels 14. The at least one slit 147 is a narrow rectangular slit. A long edge of the at least one slit 147 is substantially perpendicular to that of the first rectangular opening 141 and substantially parallel to the front edge of each of the pair of side panels 14.

In one embodiment, the bracket 10 is integrally formed by bending a piece of sheet metal (see FIG. 3). A width of the first plate 161 is substantially equal to that of the second plate 162. A length of each of the first plate 161 and the second plate 162 is substantially equal to that of each of the pair of side panels 14.

The tray 20 includes a pair of sidewalls 22 and a pair of connecting pieces 24 connected between the pair of sidewalls 22 and located at a bottom of the tray 20. A front one of the pair of connecting pieces 24 is located adjacent a front side of the pair of sidewalls 22. A rear one of the pair of connecting pieces 24 is located adjacent a rear side of the pair of sidewalls 22. The pair of connecting pieces 24 lies on the same plane which is substantially perpendicular to the pair of sidewalls 22. An engaging block 221 protrudes outwardly from an outer surface of each of the pair of sidewalls 22 corresponding to the first rectangular opening 141. A pair of resisting pieces 223 extends substantially perpendicularly and inwardly from rear edges of the pair of sidewalls 22. A pair of supporting flanges 26 extends substantially perpendicularly and inwardly from bottom edges of the pair of sidewalls 22. Each of the pair of supporting flanges 26 is located between the pair of connecting pieces 24 and in proximity to the front one of the pair of connecting pieces 24. A pair of resilient handles 28 extends ahead of front edges of the pair of sidewalls 22. Each of the pair of resilient handles 28 includes a first arc-shaped portion 281 extending from the front edge of one of the pair of sidewalls 22, a second arc-shaped portion 282 extending from the first arc-shaped portion 281, and a third arc-shaped portion 283 extending from the second arc-shaped portion 282. Each of the pair of resilient handles 28 has an S shape or an inverted S shape. A wedge-shaped protrusion 284 protrudes from a corner joint between the first arc-shaped portion 281 and the second arc-shaped portion 282 corresponding to the at least one slit 147.

Figure 4:
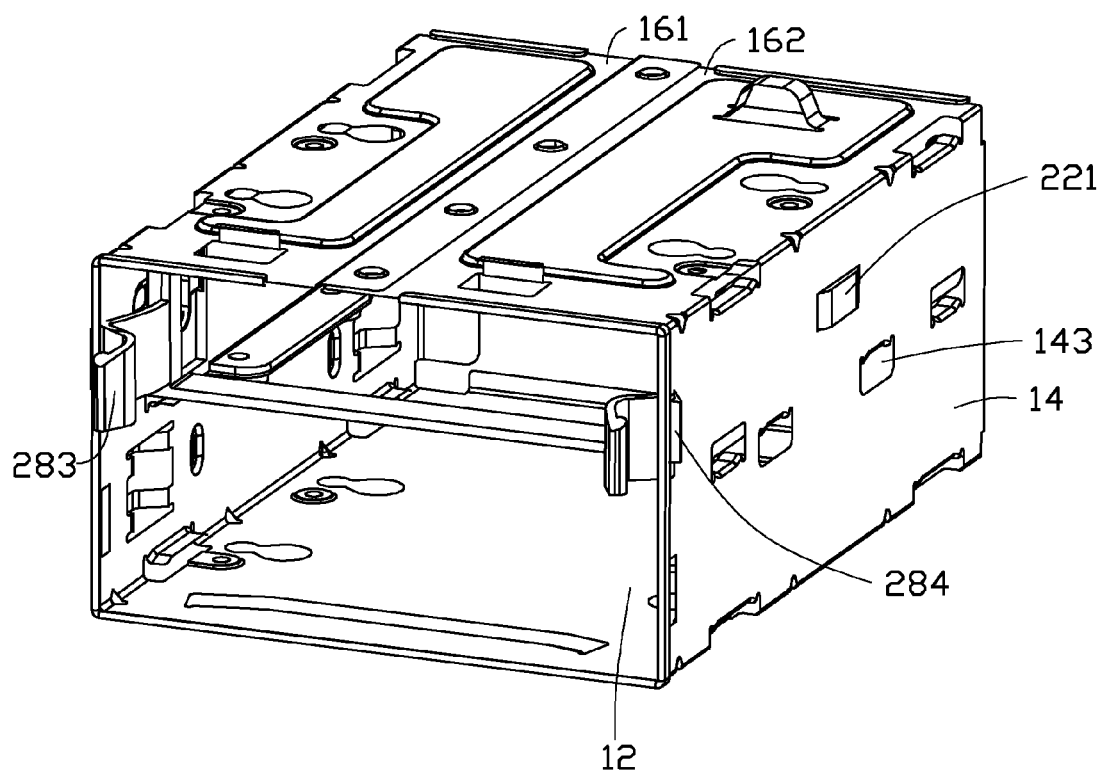
FIG. 4 is an assembled view of the bracket assembly of FIG. 1.

Referring to FIG. 4, in assembly, the tray 20 slides into the bracket 10 along the supporting piece 145. The engaging block 221 is engaged with the first rectangular opening 141. The pair of side panels 14 deforms the pair of resilient handles 28 until the wedge-shaped protrusion 284 is engaged with the at least one slit 147. The tray 20 is secured in the bracket 20 and supported by the supporting piece 145. In one embodiment, the tray 20 can accommodate a hard disk drive therein. The pair of resisting pieces 223 can prevent the hard disk drive from moving out from a rear side of the tray 20.

To detach the tray 20 from the bracket 10, the pair of resilient handles 28 is deformed in opposite directions. The wedge-shaped protrusion 284 is disengaged from the at least one slit 147. The pair of sidewalls 22 is deformed slightly. The engaging block 221 is disengaged from the first rectangular opening 141, so that the tray 20 can slide out from the bracket 10.

In one embodiment, the tray 20 is securely mounted in the bracket 10. The hard disk drive held in the tray 20 does not touch the bracket 10 directly, which can decrease the vibration of the bracket 10.

While the present disclosure has been illustrated by the description in this embodiment, and while the embodiment has been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A bracket assembly comprising:
   a bracket comprising a base panel, a pair of side panels extending from opposite sides of the base panel, and a top panel connected between the pair of side panels, a slit defined in each of the pair of side panels; and
   a tray secured in the bracket for accommodating a disk drive, the tray comprising a pair of sidewalls abutting inner sides of the pair of side panels and a pair of connecting pieces connected between the pair of side walls for supporting the disk drive, wherein the top panel comprises a first plate extending substantially perpendicularly from an upper edge of a first side panel of the pair of side panels and a second plate extending substantially perpendicularly from an upper edge of a second side panel of the pair of side panels; wherein the first plate and the second plate are partially overlapped with each other and fixed to each other; the tray further comprising a resilient handle extending from each of the pair of sidewalls and a wedge-shaped protrusion protruding from the resilient handle and engaging with the slit, the resilient handle comprising a first arc-shaped portion extending from a front edge of one of the pair of sidewalls, a second arc-shaped portion extending from the first arc-shaped portion, and a third arc-shaped portion extending from the second arc-shaped portion, wherein the third arc-shaped portion is a free end of the resilient handle, and the wedge-shaped protrusion protrudes outwardly from a corner joint between the first arc-shaped portion and the second arc-shaped portion.

2. The bracket assembly of claim 1, wherein a first rectangular opening is defined in each of the pair of side panels, and the tray further comprises an engaging block protruding from an outer surface of each of the pair of sidewalls and engaged with the first rectangular opening for securing the tray in the bracket.

3. The bracket assembly of claim 1, wherein each resilient handle has an S shape or an inverted S shape.

4. The bracket assembly of claim 1, wherein the slit is a narrow rectangular slit located adjacent a front edge of one of the pair of side panels, and a long edge of the slit is substantially perpendicular to that of the first rectangular opening.

5. The bracket assembly of claim 2, wherein a second rectangular opening is defined in each of the pair of side panels and located below the first rectangular opening, and the bracket further comprises a supporting piece extending from an upper edge of the second rectangular opening for supporting the tray.

6. The bracket assembly of claim 1, wherein the pair of connecting pieces lies on the same plane which is substantially perpendicular to the pair of sidewalls, a first connecting piece of the pair of connecting pieces is located adjacent a front side of the tray, and a second connecting piece of the pair of connecting pieces is located adjacent a rear side of the tray.

7. The bracket assembly of claim 6, wherein the tray further comprises a supporting flange extending substantially perpendicularly from a bottom edge of each of the pair of sidewalls for supporting the disk drive.

8. The bracket assembly of claim 1, wherein the tray further comprises a pair of resisting pieces extending substantially perpendicularly from rear edges of the pair of sidewalls for preventing the disk drive from sliding out from a rear side of the tray.

9. A bracket assembly comprising:
   a bracket comprising a base panel, a pair of side panels extending from opposite sides of the base panel, a first plate extending substantially perpendicularly from an upper edge of a first side panel of the pair of side panels, and a second plate extending substantially perpendicularly from an upper edge of a second side panel of the pair of side panels, the first plate and the second plate being partially overlapped with each other and fixed to each other, and a slit being defined in each of the pair of side panels; and
   a tray secured in the bracket for accommodating a disk drive, the tray comprising a pair of sidewalls abutting inner sides of the pair of side panels, a resilient handle extending from each of the pair of sidewalls, and a wedge-shaped protrusion protruding from the resilient handles and engaged with the slit, the resilient handles comprising a first arc-shaped portion extending from a front edge of one of the pair of sidewalls, a second arc-shaped portion extending from the first arc-shaped portion, and a third arc-shaped portion extending from the second arc-shaped portion as a free end of the resilient handles, wherein the pair of sidewalls of the tray abut the inner sides of the pair of side panels with the resilient handles engaging the inner sides of the pair of side panels.

10. The bracket assembly of claim 9, wherein each resilient handle has an S shape or an inverted S shape.

11. The bracket assembly of claim 9, wherein a first rectangular opening is defined in each of the pair of side panels, and the tray further comprises an engaging block protruding from an outer surface of each of the pair of sidewalls and engaged with the first rectangular opening for securing the tray in the bracket.

12. The bracket assembly of claim 11, wherein the slit is a narrow rectangular slit located adjacent a front edge of one of the pair of side panels, and a long edge of the slit is substantially perpendicular to that of the first rectangular opening.

13. The bracket assembly of claim 11, wherein a second rectangular opening is defined in each of the pair of side panels and located below the first rectangular opening, and the bracket further comprises a supporting piece extending from an upper edge of the second rectangular opening for supporting the tray.

14. The bracket assembly of claim 9, wherein the tray further comprises a pair of connecting pieces connected between the pair of side walls for supporting the disk drive.

15. The bracket assembly of claim 14, wherein the pair of connecting pieces lies on the same plane which is substantially perpendicular to the pair of sidewalls, a first connecting piece of the pair of connecting pieces is located adjacent a front side of the tray, and a second connecting piece of the pair of connecting pieces is located adjacent a rear side of the tray.

16. The bracket assembly of claim 9, wherein the tray further comprises a supporting flange extending substantially perpendicularly from a bottom edge of each of the pair of sidewalls for supporting the disk drive.

17. The bracket assembly of claim 9, wherein the tray further comprises a pair of resisting pieces extending substantially perpendicularly from rear edges of the pair of sidewalls for preventing the disk drive from sliding out from a rear side of the tray.

* * * * *